United States Patent
Kato

(10) Patent No.: US 10,294,361 B2
(45) Date of Patent: May 21, 2019

(54) THERMALLY STABLE POLYOXYMETHYLENE COMPOSITIONS

(71) Applicant: E. I. DU PONT DE NEMOURS AND COMPANY, Wilmington, DE (US)

(72) Inventor: Makoto Kato, Utsunomiya (JP)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/106,079

(22) PCT Filed: Oct. 21, 2014

(86) PCT No.: PCT/US2014/061469
§ 371 (c)(1),
(2) Date: Jun. 17, 2016

(87) PCT Pub. No.: WO2015/094473
PCT Pub. Date: Jun. 25, 2015

(65) Prior Publication Data
US 2016/0319123 A1 Nov. 3, 2016

Related U.S. Application Data

(60) Provisional application No. 61/918,286, filed on Dec. 19, 2013.

(51) Int. Cl.
| | |
|---|---|
| C08K 5/00 | (2006.01) |
| C08K 5/13 | (2006.01) |
| C08L 33/26 | (2006.01) |
| C08L 59/02 | (2006.01) |
| C08L 77/06 | (2006.01) |

(52) U.S. Cl.
CPC ............ C08L 59/02 (2013.01); C08K 5/005 (2013.01); C08K 5/13 (2013.01); C08L 33/26 (2013.01); C08L 77/06 (2013.01); C08L 2201/08 (2013.01); C08L 2205/03 (2013.01)

(58) Field of Classification Search
CPC .......... C08L 59/02; C08L 33/26; C08L 77/06; C08L 2205/03; C08L 2201/08; C08K 5/005; C08K 5/13
USPC ........................................................ 524/323
See application file for complete search history.

(56) References Cited

U.S. PATENT DOCUMENTS

| | | | |
|---|---|---|---|
| 5,011,890 A | 4/1991 | Novak | |
| 5,106,888 A | 4/1992 | Kosinski | |
| 5,128,405 A * | 7/1992 | Sugiyama | C08K 5/1345 524/291 |
| 2005/0288438 A1 | 12/2005 | Nandi | |
| 2013/0324675 A1 * | 12/2013 | Luo | C08G 6/00 525/398 |

FOREIGN PATENT DOCUMENTS

| | | |
|---|---|---|
| EP | 0435649 A1 | 7/1991 |
| WO | 90/15840 A1 | 12/1990 |

OTHER PUBLICATIONS

PCT International Search Report and Written Opinion for International Application No. PCT/US2014/061469, dated Jan. 9, 2015.

* cited by examiner

*Primary Examiner* — Angela C Scott

(57) ABSTRACT

Polyoxymethylene compositions either consisting essentially of: polyoxymethylene polymer; at least pme amine polymer selected from the group consisting of polyacrylamides, polyallylamines, polyacrylic hydrazide, polymethacrylic hydrazide, polyaminoalkyl acrylate, polyaminoalkyl methacrylate, poly vinylalkylamine, and mixtures of these; and at least pme polyimide having a melting point that ranges between 20° C. below the melting point of (a) to 20° C. above the melting point of the polyoxymethylene polymer.

5 Claims, No Drawings

THERMALLY STABLE POLYOXYMETHYLENE COMPOSITIONS

OVERVIEW

Described herein are thermally stabilized polyoxymethylene resin compositions that, when molded, have a combined property of certain time to mold deposit and a certain tensile creep to 10% strain.

Polyoxymethylene (POM, also known as polyacetal) exhibits the properties of tribology, hardness, stiffness, moderate toughness, coefficient of friction, solvent resistance, and ability to crystallize rapidly that are particularly suitable to produce articles for demanding uses. However, during melt-processing, polyoxymethylenes can degrade and release formaldehyde. Formaldehyde evolution, measured as thermally evolved formaldehyde (TEF-T), is an indirect measure of the heat stability of POM compositions.

Although many combinations of heat stabilizers may provide thermal stability as measured by TEF-T, other performance issues often arise such as mold deposits in longer cycle times. Many heat stabilizers detract from tensile creep performance as well. During the manufacture of molded articles, such as gears, from POM compositions, single screw and twin screw extruders get coated with deposits of the molding composition, which eventually interfere with article production because the molding equipment must be stopped and cleaned. If cleaning must occur often, manufacturing cost increases and loses efficiency.

U.S. Pat. No. 5,011,890 discloses polyacetal compositions including polymers having formaldehyde reactive nitrogen groups such as polyacrylamide. U.S. Pat. No. 5,106,888 discloses polyacetal compositions including microcrystalline cellulose (MCC) as a thermal stabilizer with polyamide. The use of epoxidized fatty acid stabilizer as polyoxymethylene stabilizers has been disclosed in US 2005/0288438.

Needed are polyoxymethylene compositions that exhibit the following combined properties in articles molded from them: thermal stability during melt-processing; little or no mold deposit over long cycle times; and relatively low tensile creep to strain during use at elevated temperatures.

Disclosed herein are compositions that exhibit the compound property of low tensile creep to strain at elevated temperatures, very little or no mold deposit over long cycle times, and thermal stability during melt-processing. Specifically disclosed herein are polyoxymethylene compositions consisting essentially of:

(a) 95.85 to 99.94 weight percent polyoxymethylene polymer, (b) 0.4 to 0.6 weight percent of an amine polymer selected from the group consisting of polyacrylamides, polyallylamines, polyacrylic hydrazide, polymethacrylic hydrazide, polyaminoalkyl acrylate, polyaminoalkyl methacrylate, poly vinylalkylamine, and mixtures of these, and (c) 0.008 to 0.08 weight percent of a polyamide, having a melting point that ranges between 40° C. below the melting point of (a) to 20° C. above the melting point of (a), wherein the polyoxymethylene composition, when molded, exhibits:

a tensile creep to 10% strain at 90° C. and 25 MPa pressure of at least 0.32 minutes, as determined according to ASTM D2990;

a time to mold deposit of at least 12 hours; and optionally, a thermally evolved formaldehyde of less than 0.50 percent, as measured at 250° C. for a period of 0.5 hours.

Also disclosed herein are articles made of these compositions.

DETAILED DESCRIPTION

Definitions

As used herein, the terms "a", an refers to one, more than one and at least one and therefore does not necessarily limit its referent noun to the singular.

As used herein, the terms "comprises," "comprising," "includes," "including," "has," "having", "consisting essentially of", and "consisting of" or any other variation of these, may refer either to a non-exclusive inclusion or to an exclusive inclusion.

When these terms refer to a non-exclusive inclusion, a process, method, article, or apparatus that comprises a list of elements is not limited to the listed elements but may include other elements not expressly listed or which may be inherent. Further, unless expressly stated to the contrary, "or" refers to an inclusive, not an exclusive, or. For example, a condition A or B is satisfied by any one of the following: A is true (or present) and B is false (or not present), A is false (or not present) and B is true (or present), and both A and B are true (or present).

When these terms refer to a more exclusive inclusion, these terms limit the scope of a claim to those recited materials or steps that materially affect the novel elements of the recited invention. When these terms refer to a wholly exclusive inclusion, these terms exclude any element, step or component not expressly recited in the claim.

As used herein, the term "consisting essentially of" limits the scope of a claim reciting this term to those recited materials or steps that materially affect the novel elements of the recited invention.

As used herein, the term "consisting of" limits the scope of a claim reciting this term by excluding any element, step, or component not expressly recited in the claim.

As used herein, the term "article" refers to an unfinished or finished item, thing, object, or an element or feature of an unfinished or finished item, thing or object. As used herein, when an article is identified as unfinished, the term "article" may refer to any item, thing, object, element, device, etc. that will be included in a finished article and/or will undergo further processing in order to become a finished article.

As used herein, when an article is identified as finished, the term "article" refers to an item, thing, object, element, device, etc. that has undergone processing to completion to thereby be suitable for a particular use/purpose.

An article may comprise one or more element(s) or subassembly(ies) that either are partially finished and awaiting further processing or assembly with other elements/subassemblies that together will comprise a finished article.

As used herein, the terms "polyoxymethylene", "polyacetal" includes homopolymers of formaldehyde or of cyclic oligomers of formaldehyde, the terminal groups of which are end-capped by esterification or etherification, and co-polymers of formaldehyde or of cyclic oligomers of formaldehyde and other monomers that yield oxyalkylene groups with at least two adjacent carbon atoms in the main chain, the terminal groups of which co-polymers can be hydroxyl terminated or can be end-capped by esterification or etherification. As used herein, the term "amine polymer" refers to a polymer having "formaldehyde reactive nitrogen groups" as described in U.S. Pat. No. 5,011,890, col. 7:22-42, which portion of the '890 patent is hereby incorporated herein by reference.

As used herein, the term "tensile creep to strain" refers generally to the time a test sample took to reach a specified percent strain under a certain load and at a certain temperature. The term "tensile creep to 10% strain at 90° C." refers to the time for the test sample to reach 10% strain under a certain load and at 90° C. Tensile creep to strain is determined according to ASTM D2990 and informs on the long-term stability of a molded test sample under specific conditions.

As used herein, the terms "heat distortion temperature" "heat deflection temperature" refer to the temperature at which a polymer or plastic sample deforms under a specified load. The determination is done according to ISO-075-2 method, with a load of 1.8 MPa.

As used herein, the term "flexural fatigue" refers generally to a physical property expressed by the number of times a material can be bent on itself through a prescribed angle before it ruptures or loses its ability to recover. More specifically, it is that cycle when the maximum amplitude of the test sample reached ±8.0 mm, as determined according to ASTM D671(b). Flexural fatigue informs on the long-term stability of a molded article at a specific load and temperature.

As used herein, the term "mold deposit" is a property determined by the PRESENCE or ABSENCE of a deposit observable to the unaided human eye of on the surface of a mold or screw used continuously to prepare molded articles. The presence of such a deposit may be observable by the unaided human eye as a trace deposit or as an off white deposit, etc.

As used herein, the term "time to mold deposit" refers to that duration when a change in the surface appearance, determined as the presence of a mold deposit, of a mold or screw used continuously to prepare molded articles was first observable to the unaided human eye.

As used herein, the term "thermally evolved formaldehyde" refers to that formaldehyde that evolves from heated polyoxymethylene and constitutes a quantitative measure of thermal stability of POM composition.

Abbreviations

As used herein, "weight percent" is abbreviated as "wt %".

As used herein, "polyoxymethylene" is abbreviated as "POM".

As used herein, "heat deflection temperature is abbreviated as "HDT".

As used herein, "thermally evolved formaldehyde" is abbreviated as "TEF-T".

As used herein, "Megapascals" is abbreviated as "MPa".

As used herein, "grams per mole" is abbreviated as "g/mol".

As used herein, "grams per minute" is abbreviated as "g/min".

As used herein, "milliliter" is abbreviated as "ml".

As used herein, "cycles per minute" is abbreviated as "cpm".

As used herein, "parts per million" is abbreviated as "ppm".

As used herein, "High-Performance Liquid Chromatography is abbreviated as "HPLC".

As used herein, "Hertz" is abbreviated as "Hz".

Ranges

Any range set forth herein includes its endpoints unless expressly stated otherwise. Setting forth an amount, concentration, or other value or parameter as a range specifically discloses all ranges formed from any pair of any upper range limit and any lower range limit, regardless of whether such pairs are separately disclosed herein. To the point, the ranges in the compositions and articles described herein are not limited to specific pairs of upper and lower limits disclosed in the description.

Preferred Variants

The setting forth of variants in terms of materials, methods, steps, values, ranges, etc.—whether identified as preferred variants or not—of the compositions and articles described herein is specifically intended to disclose any composition and article that includes ANY combination of such materials, methods, steps, values, ranges, etc. Such combinations are specifically intended to be preferred variants of the compositions and articles described herein.

Generally: Compositions Described Herein

The compositions described herein consist essentially of
(a) 95.85 to 99.94 weight percent polyoxymethylene polymer,
(b) 0.4 to 0.6 weight percent of an amine polymer selected from the group consisting of polyacrylamides, polyallylamines, polyacrylic hydrazide, polymethacrylic hydrazide, polyaminoalkyl acrylate, polyaminoalkyl methacrylate, poly vinylalkylamine, and mixtures of these, and
(c) 0.008 to 0.08 weight percent of a polyamide, having a melting point that ranges between 40° C. below the melting point of (a) to 20° C. above the melting point of (a),
wherein the polyoxymethylene composition, when molded, exhibits:
a tensile creep to 10% strain at 90° C. and 25 MPa pressure of at least 0.32 minutes, as determined according to ASTM D2990;
a time to mold deposit of at least 12 hours, and optionally, a
thermally evolved formaldehyde of less than 0.50 percent, as measured at 250° C. for a period of 0.5 hours.

Any of the compositions described herein includes the elements described in the previous paragraph AND may include any one or any combination of the following elements set forth in this paragraph. And, to avoid ambiguity, this paragraph is intended to provide express, literal, and photographic support for any composition described herein that includes any one or any combination of the following elements in this paragraph. Specifically, the compositions described herein also may:

consist only of, instead of consist essentially of, components (a), (b), and (c) or (a) and (b); and/or
additionally consist essentially 0.01 to 4.0 weight percent of an antioxidant, so long as the addition of the antioxidant does not materially affect the properties of TEF-T, tensile creep to 10% strain at 90° C., and time to mold deposit as recited in the claims; and/or
have, for component (c), polyamide 66/610/6 terpolymer; and/or
have, for component (b), polyacrylamides, polyallylamines, polyvinylalkylamines, or mixtures of these.
have, for the antioxidant, a hindered phenolic antioxidant.

(a) Polyoxymethylene (POM) Polymer

The polyoxymethylene (also known as polyacetal) in the compositions described herein may be one or more homopolymers, copolymers, or mixtures of these. Homopolymers are prepared by polymerizing formaldehyde or formaldehyde equivalents, such as cyclic oligomers of formaldehyde.

Copolymers may contain one or more co-monomers generally used in preparing polyoxymethylene compositions, which include acetals and cyclic ethers that lead to the incorporation into the polymer chain of ether units with 2-12 sequential carbon atoms. If a copolymer is used in these compositions, the quantity of co-monomer will not be more than 20 weight percent, preferably not more than 15 weight percent, and most preferably about two weight percent. Preferable comonomers are 1,3-dioxolane, ethylene oxide, and butylene oxide, where 1,3-dioxolane is more preferred, and preferable polyoxymethylene copolymers are copolymers where the quantity of co-monomer is about 2 weight percent.

It is also preferred that the homo- and copolymers are: 1) homopolymers whose terminal hydroxy groups are end-capped by a chemical reaction to form ester or ether groups; or, 2) copolymers that are not completely end-capped, but that have some free hydroxy ends from the co-monomer unit or are terminated with ether groups. Suitable end groups for homopolymers are acetate and methoxy and preferred end groups for copolymers are hydroxy and methoxy.

The polyoxymethylene used in the compositions described herein may be branched or linear and will generally have a number average molecular weight of at least 10,000, preferably 20,000-90,000. The molecular weight can be conveniently measured by gel permeation chromatography in m-cresol at 160° C. using a DuPont PSM bimodal column kit with nominal pore size of 60 and 1000 angstrom. The molecular weight can also be measured by determining the melt flow using ASTM D1238 or ISO 1133. The melt flow will be in the range of 0.1 to 100 g/min, preferably from 0.5 to 60 g/min, or more preferably from 0.8 to 40 g/min. for injection molding purposes.

The amount of POM in these compositions ranges from 95.00 to 99.95, preferably from 95.00 to 99.94, more preferably from 95.85 to 99.94, weight percent of the total weight of the composition.

(b) Amine Polymer

Component (b) in these compositions is an amine polymer selected from poly-acrylamides, polyallylamines, poly-acrylic hydrazide, polymethacrylic hydrazide, polyaminoalkyl acrylate, polyaminoalkyl methacrylate, poly vinylalkylamine, or mixtures of these.

The amine polymer is preferably a polyacrylamide, which preferably has a weight-average molecular weight ($M_w$) of about 20,000 to 30,000 g/mol and preferably a weight-average molecular weight ($M_w$) of about 24,000 g/mol, a number-average molecular weight ($M_n$) of about of 5,000 to 10,000 g/mol and a polydispersity index of about 2.5 to 3.5, preferably about 3.1, as measured by aqueous gel permeation chromatography.

The amount of component (b) in these compositions ranges from 0.10 to 1.0, preferably from 0.20 to 0.80, and more preferably from 0.40 to 0.60 percent of the total weight of the composition.

(c) Polyamide

When present in these compositions, component (c) is a polyamide that has a melting point of about 140° C. to about 220° C., preferably about 145° C. to about 220° C. The melting point of component (c) ranges between 40° C. below the melting point of (a) to 40° C. above the melting point of (a), preferably between 35° C. below the melting point of (a) to 30° C. above the melting point of (a), and more preferably between 30° C. below the melting point of (a) to 30° C. above the melting point of (a).

The designation of polyamides corresponds to international standard ISO 1874-1: the first number indicates the number of carbon atoms of the starting amine; the last number indicates the number of carbon atoms of the dicarboxylic acid. When a single number is given, one starts from an amino-carboxylic acid or its lactam, respectively. For example, the polyamide from hexamethylenediamine and sebacic acid is designated as polyamide 610 (PA 610), the polyamide from caprolactam is designated as PA 6. The components are separately listed by slash in order of their parts per amount and are followed by the parts per amount within brackets, e.g. copolyamide 6/66/610(50:30:20) to characterize copolyamides.

Polyamide resins in these compositions are condensation products of at least one dicarboxylic acids and at least one diamine, and/or at least one aminocarboxylic acids, and/or ring-opening polymerization products of at least one cyclic lactams and have a melting point of about 140° C. to about 240° C. The polyamide resins are selected from fully aliphatic polyamide resins, semi-aromatic polyamide resins and mixtures of these. As used herein, "semi-aromatic" means polyamide resins that comprise at least some aromatic carboxylic acid monomer(s) and aliphatic diamine monomer(s), compared to "fully aliphatic", meaning polyamide resins comprising aliphatic carboxylic acid monomer(s) and aliphatic diamine monomer(s).

Fully aliphatic polyamide resins are formed from aliphatic and alicyclic monomers such as diamines, dicarboxylic acids, lactams, aminocarboxylic acids, and their reactive equivalents. A suitable aminocarboxylic acid includes 11-aminododecanoic acid. Suitable lactams include caprolactam and laurolactam. As used herein, the term "fully aliphatic polyamide resin" refers to copolymers derived from two or more such monomers and blends of two or more fully aliphatic polyamide resins. Linear, branched, and cyclic monomers may be used.

Carboxylic acid monomers useful in the preparation of fully aliphatic polyamide resins include, but are not limited to, aliphatic carboxylic acids, such as for example adipic acid (C6), pimelic acid (C7), suberic acid (C8), azelaic acid (C9), sebacic acid (C10), dodecanedioic acid (C12) and tetradecanedioic acid (C14). Useful diamines include those having four or more carbon atoms, including, but not limited to tetramethylene diamine, hexamethylene diamine, octamethylene diamine, decamethylene diamine, 2-methylpentamethylene diamine, 2-ethyltetramethylene diamine, 2-methyloctamethylene diamine; trimethylhexamethylene diamine and/or mixtures thereof. Suitable examples of fully aliphatic polyamide polymers include poly(ε-caprolactam) PA6; poly (2-methylpentamethylene hexanediamide) (PAD6); poly(pentamethylene decanediamide) (PA510); poly(hexamethylene dodecanediamide) (PA612); poly(hexamethylene tridecanediamide) (PA613); PA614; poly(hexamethylene pentadecanediamide) (PA615); PA616; poly(11-aminoundecanamide) (PA11); poly(12-aminododecanamide) (PA12); PA10; PA 912; PA913; PA914; PA915; PA616; PA936; PA1010; PA1012; PA1013; PA1014; PA1210; PA1212; PA12,13; PA1214 and copolymers and blends of the same. Especially suitable examples of fully aliphatic polyamide resins include PA6, PA11, PA12, PA10; PA610; PA612; PA1010 and copolymers and blends of the same. Especially suitable examples of fully aromatic polyamides include PA66/610/6; PA66/612/6; PA66/614/6; PA610/612/6; PA610/614/6; PA612/614/6.

Semi-aromatic polyamide resins useful as polyamide (c) must have a melting point of about 140° C. to about 240° C. Such semi-aromatic polyamides are preferably copolymers, terpolymers, or higher polymers wherein at least a portion of the acid monomers are selected from one or more aromatic carboxylic acids and wherein the mole percent of the dicarboxylic acid or diamine component that is an aliphatic repeat unit is sufficient to provide a semi-aromatic polyamide having a melting point of about 140° C. to about 240° C. The one or more aromatic carboxylic acids can be terephthalic acid or mixtures of terephthalic acid and one or more other carboxylic acids, like isophthalic acid, substituted phthalic acid such as for example 2-methylterephthalic acid and unsubstituted or substituted isomers of naphthalenedicarboxylic acid. Preferably, the one or more aromatic carboxylic acids are selected from terephthalic acid, isophthalic acid and mixtures thereof. Furthermore, the one or more carboxylic acids can be mixed with one or more aliphatic carboxylic acids, like adipic acid; pimelic acid; suberic acid; azelaic acid; sebacic acid and dodecanedioic acid, to provide a semi-aromatic polyamide having a melting point of about 140° C. to about 240° C. Semi-aromatic polyamide resins also comprise one or more diamines that can be chosen among diamines having four or more carbon atoms, including, but not limited to tetramethylene diamine, hexamethylene diamine, octamethylene diamine, nonamethylene diamine, decamethylene diamine, 2-methylpentamethylene diamine, 2-ethyltetramethylene diamine, 2-methyloctamethylene diamine; trimethylhexamethylene diamine, bis(p-aminocyclohexyl)methane; m-xylylene diamine; p-xylylene diamine and/or mixtures of these.

The polyamide of component (c) may be an aliphatic polyamide, a semi-crystalline polyamide, or a mixture of these so long as the melting point of component (b) is about 140° C. to about 240° C. Component (c) preferably includes homopolyamides and copolyamides, e.g., polyamide 12, polyamide 612 and polyamide 66/610/6, and substituted polyamides having a methylol group or other groups having a hydroxyl group.

An especially preferred polyamide for component (c) is PA66/610/6 terpolymer having aliphatic repeat units selected from the group consisting of hexamethylene hexanediamide, hexamethylene decanediamide and ε-caprolactam.

The amount of component (c) in these compositions ranges from 0.005 to 0.15, preferably from 0.008 to 0.12, and, more preferably from 0.008 to 0.08, percent of the total weight of the composition.

Although the compositions described herein may include component (c), component (c) is not necessary to impart recited values for mold deposit and for tensile creep to strain. Component (c) in these compositions may lower formaldehyde emission while simultaneously maintaining time to mold deposit and tensile creep to strain values.

(d) Additives

The compositions described herein may include additives so long as no additive materially affects the basic and novel characteristics of the compositions recited in the claims, and specifically the tensile creep value to 10% strain at 90° C., the time to mold deposit and the TEF-T value. The total concentration of all additional additives should not exceed about 5 weight percent of the total concentration of all ingredients in the polyoxymethylene composition.

Additives include, but not limited to, impact modifiers, lubricants, nucleating agents, antioxidants, thermal stabilizers, UV stabilizers, and colorants. Non-limiting examples of impact modifiers include thermoplastic polyurethanes, polyester polyether elastomers, and core-shell acrylate polymers. Suitable lubricant additives include silicone lubricants such as dimethylpolysiloxanes and their derivatives; oleic acid amides; alkyl acid amides. Other suitable additives include non-ionic surfactant lubricants; hydrocarbon waxes; chlorohydrocarbons; fluorocarbons; oxy-fatty acids; esters such as lower alcohol esters of fatty acids; polyvalent alcohols such as polyglycols and polyglycerols; and metal salts of fatty acids, such as lauric acid and stearic acid. Suitable nucleating agents include titanium oxides and talc. Preferred antioxidants are hindered phenol antioxidants, such as Irganox® 245 and 1090, available from BASF. Suitable thermal stabilizers include calcium carbonate, magnesium carbonate, and calcium stearate. Suitable ultraviolet light stabilizers include benzotriazoles, benzophenones, aromatic benzoates, cyano acrylates, and oxalic acid anilides.

Certain bis-fatty acid amides, such as N,N'-ethylenebisstearamide, should be excluded from these compositions because they may materially affect the recited properties, and thus the novel characteristics of these compositions.

Combined Property of These Compositions

Time to Mold Deposit, Tensile Creep to 10% Strain, TEF-T

The polyoxymethylene compositions described herein exhibit a surprising combination of properties, to wit, a relatively long time to mold deposit and simultaneously suitable tensile creep to strain and formaldehyde emission level when compared to polyoxymethylene compositions not consisting essentially of the recited components. The polyoxymethylene compositions described herein are sensitive not only to the addition of non-recited components, but also to the concentration of the existing components, which is precisely why these compositions are recited as consisting essentially of the three recited components. If the amine component (b) and the polyamide component (c) are outside the recited concentration ranges, the resulting polyoxymethylene compositions do not exhibit the desired combination of time to mold deposit, tensile creep to strain, and formaldehyde emission.

Specifically, the examples and comparative examples herein demonstrate that polyoxymethylene compositions achieve the recited combined property when amine polymer (b) and polyamide (c) are present in the recited concentration ranges. More specifically, if polyamide (c) is absent, the resulting polyoxymethylene compositions may exhibit relatively longer time to mold deposit and longer time to tensile creep to strain, but an undesirable increase in formaldehyde emission. Thus, to achieve the combined property of time to mold deposit, tensile creep to strain, and formaldehyde emission, the polyoxymethylene composition should not comprise additional materials that adversely affect the combined property. For example, the addition of only 0.15 wt % of Acrawax™ to the polyoxymethylene composition results in a decrease in tensile creep to strain of the polyoxymethylene composition.

Especially because of the time to mold deposit obtained by the polyoxymethylene compositions described herein, extrusion of articles made of these compositions facilitates longer, more continuous production time and relatively improved manufacturing efficiency. Prior to initiating continuous molding, the mold or screw surface appears shiny and lacks a deposit observable to the unaided human eye. During continuous molding, the mold surface changes from a shiny to a cloudy appearance, the direct result of residue or deposit on the mold or screw. Specifically, in this application, time to mold deposit occurs at the time when, during 24 hours of continuous molding, cloudiness on the mold surface is first observable by the human eye. At the first visible sign of cloudiness on the mold or screw, this is recorded as a "trace" mold deposit. When the surface of the mold or screw starts to look "white" in color according to the unaided human eye, "off-white" mold deposit is recorded. "Off-white" represents a more significant buildup of mold or screw deposits than a trace amount.

Creep to strain is the tendency of a solid material to deform under mechanical stresses and increases as articles are increasingly heated. If creep becomes too severe, the article, and in particular, gears may become non-functioning. Tensile creep to 10% strain is the time it takes the molded article to reach 10% strain when exposed to a temperature of 90° C. as determined according to ASTM D2990.

Suitable tensile creep to strain performance is especially important in those articles which are used in high temperature environments or generate heat during use such as gears, sliding parts, pump parts, valve bodies, television parts, and storage tanks under the hood of vehicles. Suitable tensile creep to strain performance also supports the manufacture of thinner or lighter parts and extends performance life.

Thermally emitted formaldehyde (TEF-T) relates in an indirect way to the thermal stability of polyoxymethylene compositions. The polyoxymethylene composition to be tested is heated to a specific temperature and the evolved gases are collected and analyzed for formaldehyde. The greater the formaldehyde emitted from the sample, the greater the thermal degradation of the polyoxymethylene composition. TEF-T results were determined after thirty minutes of heating at 250° C. and reported herein as TEF-T which represents total thermally emitted formaldehyde of the polyoxymethylene composition.

Therefore, the examples especially show that the polyoxymethylene compositions described herein are particularly well suited to continuous manufacturing processes for the production of molded articles such as gears, sliding and guiding elements, housing parts, springs, chains, screws, nuts, fan wheels, turbine blades, pump parts, valve bodies, insulators, connectors, parts for electronic devices such as televisions, telephones, automotive lights, etc., fuel sender units, aerosol cans, vehicle storage tanks, coffee brewer parts, and handles and grips for guns and knives because these articles have relatively improved efficiency of production and are at the same time, relatively thermally stable and able to withstand creep forces during use.

Methods of Making the Compositions Described Herein

The polyoxymethylene compositions described herein may be made by melt-blending the components using any known methods. The component materials may be mixed to homogeneity using a melt-mixer such as a single or twin-screw extruder, blender, kneader, Banbury mixer, etc. to give a resin composition. Or, part of the materials may be mixed in a melt-mixer, and the rest of the materials may then be added and further melt-mixed until homogeneous. When adding the components in a stepwise fashion, part any component and any other component may be first added and melt-mixed with the remaining components and further melt-mixed until a well-mixed composition is obtained. The melt-mixing can result in pellets, which can be extruded or molded into articles.

Articles Comprising the Compositions Described Herein

The compositions described herein may be molded into articles using any suitable melt-processing technique known in the art, such as injection molding, extrusion molding, blow molding, and injection blow molding are preferred and injection molding is more preferred. In addition, these compositions may be formed into films and sheets by extrusion to result in either cast and/or blown films. Such sheets may be further thermoformed into articles and structures that may be oriented from the melt or at a later stage in processing.

These compositions may also be used to form fibers and filaments that may be oriented from the melt or at a later stage in processing. Articles comprising these compositions include, without limitation, gears, toys, cigarette lighter bodies, writing pen bodies, conveyor belt parts, safety restraint parts, etc.

EXAMPLES

The exemplary compositions identified by "E" in the tables below are intended only to further illuminate and not to limit the scope of compositions, methods, and articles described and recited herein. Comparative examples are identified in the tables below by "CE".

Materials

In the compositions listed in the tables below, the following materials were used:

Polyoxymethylene: Delrin®100 acetal homopolymer having a melting point of 178° C., available from E.I. DuPont de Nemours and Company, Wilmington, Del., USA [DuPont].

Amine polymer: MAP 1070 is a polyacrylamide thermal stabilizer and is a 20 weight percent polyethylene glycol coated polyacrylamide, with weight-average molecular weight (Mw) of 24,000 g/mol, a number-average molecular weight (Mn) of 7,700 g/mol, a polydispersity index of 3.1 by aqueous gel permeation chromatography, available from DuPont.

Polyamide: PA 66/610/6 terpolymer (33/23/43 mol %) is a thermal stabilizer with melting point of 150-160° C. and s ground prior to compounding to pass a 20 MESH screen.

Hindered phenolic stabilizer: Irganox 245, available from BASF.

Mold release agent: Acrawax C (N,N' Ethylenebisstearamide), available from Lonza Chemicals.

Methods

In the compositions listed in the tables below, the following methods were used:

Melting Point

Melting points were as determined with DSC at a scan rate of 10° C./min in the first heating scan, wherein the melting point was taken at the maximum of the endothermic peak.

Tensile Creep Test

Tensile creep, that is, in these examples, the time to 10% strain at 90° C., was determined according to ASTM D2990.

Flexural Fatigue

The flexural fatigue at 23.5 MPa, 80° C., 1800 cpm was determined according to ASTM D671 (b) using Toyo Seiki Seisaku-sho, Ltd. Model B50. However, ASTM D671 (b) has been withdrawn without a replacement. 1800 cycles per minutes is equivalent to 30 Hertz. Currently, measuring flexural fatigue using newer apparatus supplied by Toyo Seiki Seisaku-sho, Ltd. is determined according to JIS (Japan Industrial Standard) K7119. Additionally, flexural fatigue may be determined according to ASTM D7774-12 (2012).

Heat Distortion (or Deflection) Temperature (HDT)

HDT was determined according to ISO 75-2 with 1.8 MPa load.

Thermal Stability

The following procedure was used to measure thermally evolved formaldehyde, which was determined after 30 minutes of heating the polyoxymethylene composition: A weighed sample of the polyacetal composition to be tested was placed in a tube and the tube was fitted with a cap for introduction of nitrogen to the test sample and for the removal of any evolved gases from the apparatus while maintaining the sample in an oxygen-free environment. The sample was heated at 250° C. in a silicone oil bath. The nitrogen and any evolved gases were transported and bubbled through 75 mL of an aqueous 40 g/L sodium sulfite solution. Any evolved formaldehyde reacts with the sodium sulfite to liberate sodium hydroxide. The sodium hydroxide was continuously neutralized with standard 0.1N hydrogen chloride ("HCl"). The results were obtained as a chart of mL of titer versus test time.

The percent evolved formaldehyde was calculated by formula (1)

$$(V)(N)[0.03 \times 100/SW], \quad (1)$$

Where:
V is the volume of titer in milliliters
N is the normality of the titer
SW is the sample weight in grams
The factor "0.03" is the milli-equivalent weight of formaldehyde in g/milli-equivalent.
TEF results were reported after thirty minutes of heating and reported herein as TEF-T.

Time to Mold Deposit

Time to mold deposit was determined by injection molding the polyoxymethylene compositions at a process temperature of about 215° C. into a 2 cavity mold, heated to 85° C., at about 400 mold injections per hour. The property measured was PRESENCE OF MOLD DEPOSIT.

After every hour, the mold and screw were visually inspected by the unaided human eye. Mold and/or screw deposits, when present to the unaided human eye, were visible as a cloudy surface, wherein the mold or screw, lacking deposits, presented a shiny surface. The first appearance of a cloudy surface on either the mold or screw was recorded in Table 1 as a "trace". The time to mold deposit values in Table 1 represent the time at which a trace amount of mold deposit was first observed by the human eye. Off-white represents a greater quantity of mold or screw deposits than a trace amount. Although "trace" and "off-white" are used in the data tables, both terms indicate the measured property, PRESENCE of mold deposit.

Compounding and Molding

All compounding was carried out on a 40 mm twin screw extruder at a temperature of about 200° C., a screw speed of about 180 rpm. All materials were fed into the rear of the extruder. The resulting extrudates were quenched in a water bath and pelletized. The pellets were subsequently oven dried and injection molded at 85° C. mold temperature into test specimens.

Discussion of Results

In the discussion of the table below, compositions marked by "C" indicate comparative examples; compositions marked by "E" indicate exemplary compositions that support and illustrate the compositions recited in the claims.

TABLE 1

| Compositions | C1 | C2 | C3 | C4 | C5 | C6 | C7 | E1 | E2 | E3 | E4 | E5 | E6 |
|---|---|---|---|---|---|---|---|---|---|---|---|---|---|
| Component | | | | | | | | | | | | | |
| (a) POM | 99.275 | 99.225 | 99.075 | 99.340 | 99.225 | 99.325 | 99.225 | 99.375 | 99.375 | 99.415 | 99.40 | 99.350 | 99.425 |
| (b) Polyacrylamide | 0.475 | 0.475 | 0.475 | | 0.475 | 0.475 | 0.475 | 0.475 | 0.475 | 0.475 | 0.475 | 0.475 | 0.475 |
| (c) Polyamide | 0.0 | 0.05 | 0.2 | 0.550 | 0.2 | 0.100 | 0.200 | 0.05 | 0.050 | 0.010 | 0.025 | 0.075 | 0.0 |
| Irganox 245 | 0.1 | 0.1 | 0.1 | | 0.1 | 0.100 | 0.100 | 0.1 | 0.100 | 0.100 | 0.100 | 0.100 | 0.100 |
| Lowinox 22M46 | | | | 0.110 | | | | | | | | | |
| Acrawax | 0.15 | 0.15 | 0.15 | | | | | | | | | | |
| Physical Property | | | | | | | | | | | | | |
| Mold Deposit | None | Trace | Off white | Off white | Off white | Trace | Off white | Trace | Trace | None | Trace | Trace | None |
| Screw Deposit | None | Trace | Trace | Trace | Trace | Trace | Trace | Trace | Trace | None | Trace | Trace | None |
| Time to Mold deposit | None at 24 h | 20 h | 7 h | 4 h | 2 h | 4 h | 4 h | 3.8 h | 18 h | None, at 24 h | 22 h | 12 h | None, at 24 h |
| Tensile Creep to 10% strain (in hours) at 25 MPa, 90° C. | 0.26 | 0.29 | 0.46 | 0.42 | 0.54 | 0.43 | 0.54 | 0.41 | 0.34 | 0.54 | 0.38 | 0.40 | 0.48 |
| TEF-T (%) | 0.21 | 0.20 | 0.17 | 0.32 | 0.28 | 0.20 | 0.23 | 0.28 | 0.22 | 0.46 | 0.40 | 0.27 | 0.54 |

C1 and C2 show that when bis-fatty acid amides, such as N,N'-ethylenebisstearamide, were included, the tensile creep to 10% strain (at 90° C. and 25 MPa) was less than 0.3 minutes. Contrastingly, E1 shows that when bis-fatty acid amide was absent, the tensile creep to 10% strain improved to greater than 0.40 minutes.

C3, C5,-C7 show that, when the amount of polyamide (c) was outside the recited range of 0.008 to 0.08 weight percent of the amount of the POM polymer, polyoxymethylene compositions did not exhibit time to mold deposits of at least 12 hours. This result contrasts with that of E1 to E5, where the polyamide (c) amount fell within the recited range and the polyoxymethylene compositions exhibited time to mold deposits of at least 12 hours.

C4 shows that, when a POM composition lacked component (b) and component (c) was greater than the recited amount, the time to mold deposit is poor.

E6 lacked component (c) and demonstrated a formaldehyde emissions increase of greater than 0.5 percent.

What is claimed is:

1. A polyoxymethylene composition consisting essentially of:
   (a) 95.85 to 99.94 weight percent polyoxymethylene polymer,
   (b) 0.4 to 0.6 weight percent of an amine polymer selected from the group consisting of polyacrylamides, polyallylamines, polyacrylic hydrazide, polymethacrylic hydrazide, polyaminoalkyl acrylate, polyaminoalkyl methacrylate, poly vinylalkylamine, and mixtures of these;
   (c) 0.008 to 0.08 weight percent of a polyamide having a melting point of about 140° C. to about 240° C. and wherein said melting point ranges between 40° C. below the melting point of (a) to 40° C. above the melting point of (a), and
   (d) 0.01 to 4.0 weight percent of an antioxidant, wherein the polyoxymethylene composition, when molded, exhibits:
      a tensile creep to 10% strain at 90° C. and 25 MPa pressure of at least 0.32 minutes, as determined according to ASTM D2990;
      a time to mold deposit of at least 12 hours; and
      a thermally evolved formaldehyde of less than 0.50 percent, as measured at 250° C. for a period of 0.5 hours.

2. The polyoxymethylene composition of claim 1, wherein (c) is an aliphatic polyamide.

3. The polyoxymethylene composition of claim 2, wherein the aliphatic polyamide (c) is polyamide 66/610/6 terpolymer.

4. The polyoxymethylene composition of claim 1, wherein (b) is selected from the group consisting of polyacrylamides, polyallylamines, polyvinylalkylamines, and mixtures of these.

5. The polyoxymethylene composition of claim 1, wherein the antioxidant is a hindered phenolic antioxidant.

* * * * *